United States Patent Office 2,943,090
Patented June 28, 1960

2,943,090

SUBSTITUTED PIPERAZINES AND METHOD OF PREPARING THE SAME

Joseph Semb, Pearl River, and James R. Vaughan, Jr., New City, N.Y., assignors to American Cyanamid Company, New York, N.Y., a corporation of Maine No Drawing. Filed Sept. 23, 1957, Ser. No. 685,419

8 Claims. (Cl. 260—268)

This invention relates to new organic compounds. More particularly, it relates to piperazinylalkyl phenylethanol amines and methods of preparing the same.

The preparation of phenylalkyl phenylethanol amines is known, for example, Beil et al., Journal of the American Chemical Society, 76, 3149–3153 (1954). These compounds, however, do not possess the outstanding hypotensive activity of the compounds of the present invention.

The present compounds may be illustrated by the following general formula:

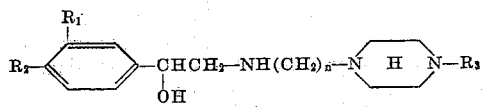

wherein $R_1$ is hydrogen, hydroxyl, or lower alkoxy radical, $R_2$ is a hydroxyl or lower alkoxy radical, $R_3$ is hydrogen or a lower alkyl, lower carboalkoxy, or pyridyl radical, and $n$ is an integer from 2 to 3. The present compounds contains amino groups and, therefore, will form acid addition salts.

The compounds of the present invention are solids. In the form of their acid salts, they melt at comparatively high temperatures, usually with decomposition. The salts are soluble in water and somewhat insoluble in the usual organic solvents.

The present compounds are prepared from the corresponding α-aminoacetophenones by catalytic hydrogenation. The reaction which takes place can be illustrated by the following equation:

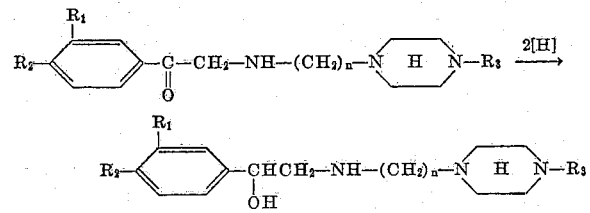

in which $R_1$, $R_2$, $R_3$, and $n$ are as defined above.

The hydrogenation is carried out in a suitable polar solvent, such as water, alcohols, dioxane, tetrahydrofurane, dimethylformamide, and the like, or mixtures thereof, using hydrogen under a pressure of 1–10 atmospheres in the presence of a catalyst such as palladium, platinum, nickel, etc., at a temperature of from 0–60° C. The starting material of the present invention is prepared, for example, by reacting veratrol or similar 1,2-dilower alkoxybenzenes with a nitrile such as a 1-lower alkyl-4-[3-(cyanomethylamino)ethyl or propyl]-piperazine in the presence of a condensing catalyst such as aluminum chloride.

The compounds of the invention are useful in the treatment of hypertension. They cause a general lowering of blood pressure for a period of time extending over a number of hours. They are effective in moderate doses without undue side effects.

The following examples illustrate in greater detail the preparation of representative compounds of the present invention.

Example 1

Twenty grams of 1-methyl-4-[3-(cyanomethylamino)-propyl]-piperazine hydrochloride and 9.0 grams of veratrol are added successively to a solution of 26.1 grams of aluminum chloride in 60 cc. of nitrobenzene with stirring at 20°–30° C. Dry hydrogen chloride is then passed through the mixture for five hours, and it is allowed to stand overnight at room temperature. The reaction mixture is then poured onto 250 g. of ice and extracted with ether to remove impurities. The aqueous phase is then concentrated to a thin syrup under reduced pressure and diluted with 250 cc. of ethanol to precipitate the crude product. This is separated and reslurried in a mixture of 150 cc. of butanol and 50 cc. of 5 N sodium hydroxide. The butanol phase is separated and the aqueous phase is again extracted with butanol. The two butanol extracts are combined, dried over magnesium sulfate, and concentrated to give the crude product as its free base. This is converted to its trihydrochloride, using alcoholic hydrochloric acid, precipitated with ether and recrystallized from aqueous alcohol. A yield of 11.0 g. of 1 - methyl - 4 - [3-(3,4-dimethoxyphenacylamino)propyl]-piperazine-trihydrochloride, melting point with decomposition at 265° C., is obtained.

Six grams of the product obtained above is heated at refluxing temperatures in 30 cc. of 48% hydrobromic acid for four hours. The solution is then cooled and diluted with 50 cc. of ethanol to precipitate the product as a crystalline solid. The solid is removed, redissolved in 30 cc. of water and decolorized with activated charcoal. On diluting the filtrate with an equal volume of concentrated hydrochloric acid and cooling, the product, 1-methyl-4-[3 - (3,4 - dihydroxyphenacylamino)propyl]-piperazine-trihydrochloride, is obtained as colorless crystals, weight 4.3 g.; melting point with decomposition at 255°–260° C.

Three grams of the product immediately above is dissolved in a mixture of 25 cc. of water and 75 cc. of ethanol in the presence of 0.5 g. of palladium on carbon catalyst and hydrogenated at atmospheric pressure. After removing the catalyst, the filtrate is concentrated to dryness and the residue reprecipitated from aqueous methanol by addition of ether. Crystallization from 125 cc. of methanol gives 1.1 g. of 1-methyl-4-{3-[2-hydroxy-2-(3,4 - dihydroxyphenyl) - ethylamino] - propyl}-piperazine-trihydrochloride, melting with decomposition at 212° C.

Example 2

A 3.5 g. sample of 1-methyl-4-[3-(3,4-dimethoxyphenacylamino)-propyl]-piperazine-trihydrochloride dihydrate, prepared as in Example 1, is hydrogenated as described above. After removal of catalyst and two recrystallizations from 50 cc. portions of methanol, there is obtained 0.9 g. of 1-methyl-4-{3-[2-hydroxy-2-(3,4-dimethoxyphenyl)-ethylamino] - propyl} - piperazine trihydrochloride, melting with decomposition at 227° C.

Example 3

Thirty-three grams of 1 - carbethoxy - 4 - [3-(cyanomethylamino)-propyl] - piperazine - dihydrochloride and 14.0 g. of veratrol are added to a solution of 33.0 g. of aluminum chloride in 70 cc. of nitrobenzene in small portions at 20° C. The reaction is carried out and the product is worked up as described in Example 1. A yield of 3.0 g. of 1-carbethoxy-4-[3-(3,4-dimethoxyphenacylamino)-propyl]-piperazine-dihydrochloride, melting with decomposition at 248° C., is obtained.

A 3.0 g. sample of the product obtained immediately above is treated with 48% hydrobromic acid and worked up as described in Example 1 to yield 2.0 g. of 1-[3-(3,4- dihydroxyphenacylamino) - propyl] - piperazine - hydrochloride.

A 1.5 g. sample of the product obtained immediately above is catalytically hydrogenated and worked up as described in Example 1 to yield 0.5 g. of alpha-{[3-(1-piperazinyl)-propylamino]-methyl}protocatechuyl alcohol-trihydrochloride.

*Example 4*

Separate solutions of 12.9 g. of 3,4-dimethoxyphenacyl bromide in 60 cc. of tetrahydrofuran and 17.2 g. of 1-methyl-4-(2-aminoethyl)-piperazine, also in 60 cc. of tetrahydrofuran, are cooled to about 7° C. and then mixed. The temperature of the mixture rises to about 20° C. The solution is stirred for one hour further, filtered, and treated with alcoholic hydrogen chloride to precipitate the product. This is removed and recrystallized from aqueous alcohol. A yield of 5.0 g. of 1-methyl-4 - [2 - (3,4 - dimethoxyphenacylamino) - ethyl]-piperazine-trihydrochloride, melting with decomposition at 256° C., is obtained.

A 5.0 g. sample of the product obtained immediately above is treated with 48% hydrobromic acid and worked up as described in Example 1 to yield 1.4 g. of 1-methyl-4-[2-(3,4-dihydroxyphenacylamino) - ethyl] - piperazine-trihydrochloride, melting with decomposition at 243° C.

A 1.3 g. sample of the product from the preceding paragraph is hydrogenated and worked up as described in Example 1 to yield 0.4 g. of alpha-{[2-(4-methyl-1-piperazinyl)-ethylamino]-methyl} - protocatechuyl alcohol-trihydrochloride, melting with decomposition at about 165° C.

*Example 5*

An experiment is carried out as in Example 4, except that 1-carbethoxy-4-(2-aminoethyl)-piperazine is used in place of 1-methyl-4-(2-aminoethyl)-piperazine and 4-methoxy-alpha-bromoacetophenone is used in place of 3,4-dimethoxyphenacyl bromide. The product obtained is 1-carbethoxy-4-[2-(4-methoxyphenacylamino)-ethyl]-piperazine-dihydrochloride.

The product obtained immediately above is hydrogenated and worked up as described in Example 1. The product resulting is 1-carbethoxy-4-{2-[2-hydroxy-2-(4-methoxyphenyl)-ethylamino] - ethyl} - piperazine - dihydrochloride.

*Example 6*

The compound 1 - carbethoxy-4-[2-(4-methoxyphenacylamino)-ethyl]-piperazine - dihydrochloride, prepared as in Example 5, when treated with glacial acetic acid saturated with hydrogen bromide, followed by making the reaction mixture alkaline, and finally by treating with alcoholic hydrochloric acid, produces 1 - [2-(4-methoxyphenacylamino) - ethyl] - piperazine - trihydrochloride.

*Example 7*

A solution of 29.0 g. of 1-(2-pyridyl)-4-(3-aminopropyl)-piperazine in about 100 cc. of tetrahydrofuran is prepared and added to a previously prepared solution of 17.0 g. of 3,4-dimethoxy-phenacyl bromide in about 100 cc. of tetrahydrofuran. Prior to mixing, the solutions are cooled to about 7° C. and a slight rise in temperature is noted after mixing. The mixture is stirred for one hour, filtered, and treated with alcoholic hydrogen chloride to precipitate the product. A yield of 15.5 g. of 1-(2-pyridyl)-4-[3-(3,4-dimethoxyphenacylamino)-propyl]-piperazine-trihydrochloride, melting with decomposition at 246° C., is obtained.

*Example 8*

A 10.0 g. quantity of 1-(2-pyridyl)-4-[3-(3,4-dimethoxyphenacylamino)-propyl] - piperazine - trihydrochloride, prepared as in Example 7, is demethylated by the method described in Example 4 to give 7.0 g. of 1-(2-pyridyl)-4-[3 - (3,4 - dihydroxyphenacylamino) - propyl]-piperazine-tetrahydrochloride, which melts with decomposition at 274° C.

The product obtained immediately above is catalytically hydrogenated, as described in Example 1, to produce 1 - (2 - pyridyl) - 4 - {3-[2-hydroxy-2 - (3,4 - dihydroxyphenyl)-ethylamino]-propyl} - piperazine - trihydrochloride, which melts with decomposition at 254° C.

We claim:

1. A compound selected from the group consisting of

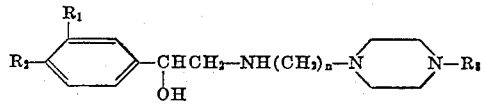

in which $R_1$ is a member of the group consisting of hydrogen, hydroxyl, and lower alkoxy radicals, $R_2$ is a member of the group consisting of hydroxyl and lower alkoxy radicals, $R_3$ is a member of the group consisting of hydrogen, lower alkyl, lower carboalkoxy, and pyridyl radicals, $n$ is an integer from 2 to 3, and acid addition salts thereof.

2. The compound 1 - methyl - 4-{3-[2-hydroxy-2-(3,4-dihydroxyphenyl)-ethylamino]-propyl}-piperazine.

3. The compound 1-methyl-4-{3-[2-hydroxy-2-(3,4-dimethoxyphenyl)-ethylamino]-propyl}-piperazine.

4. The compound alpha - {[3-(1-piperazinyl)-propylamino]-methyl}-protocatechuyl alcohol.

5. The compound alpha-{[2-(4-methyl-1-piperazinyl)-ethylamino]-methyl}-protocatechuyl alcohol.

6. The compound 1-carbethoxy-4-{2-[2-hydroxy-2-(4-methoxyphenyl)-ethylamino]-ethyl}-piperazine.

7. A method of preparing compounds having the general formula

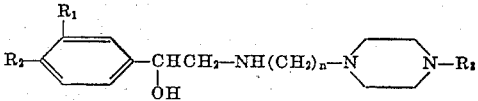

in which $R_1$ is a member of the group consisting of hydrogen, hydroxyl, and lower alkoxy radicals, $R_2$ is a member of the group consisting of hydroxyl and lower alkoxy radicals, $R_3$ is a member of the group consisting of hydrogen, lower alkyl, lower carboalkoxy, and pyridyl radicals, $n$ is an integer from 2 to 3, which comprises catalytically hydrogenating the corresponding phenacyl compounds in a solvent at a temperature of about 0–60° C. and a pressure of from 1–10 atmospheres in the presence of a hydrogenating catalyst of the group consisting of palladium, platinum and nickel.

8. A method of preparing 1-methyl-4-{3-[2-hydroxy-2-(3,4-dihydroxyphenyl)-ethylamino] - propyl} - piperazine which comprises catalytically hydrogenating 1-methyl-4-[3 - (3,4 - dihydroxyphenacylamino) - propyl]-piperazine-trihydrochloride in alcohol and water at a temperature of about 0–60° C. and a pressure of from 1–10 atmospheres in the presence of palladium catalyst.

References Cited in the file of this patent

UNITED STATES PATENTS 2,794,804     Kushner et al. _____ June 4, 1958

OTHER REFERENCES

Biel et al.: Jour. Amer. Chem. Soc., vol. 76, pp. 3149–3153 (1954).